March 22, 1966 B. DAL BIANCO ETAL Re. 25,988

ELECTRICAL SWITCHING DEVICE AND METHOD FOR MAKING

Original Filed March 18, 1958 2 Sheets-Sheet 1

Inventor
B. Dal Bianco -
M. Scata
By Albert Rosso
Attorney

ELECTRICAL SWITCHING DEVICE AND METHOD FOR MAKING

Original Filed March 18, 1958 2 Sheets-Sheet 2

Inventor
B. Dal Bianco-
M. Scata
By Albert Davis
Attorney

United States Patent Office

Re. 25,988
Reissued Mar. 22, 1966

25,988
ELECTRICAL SWITCHING DEVICE AND METHOD FOR MAKING

Bruno Dal Bianco, Milan, and Mario Scata, Monza, Italy, assignors to International Standard Electric Corporation, New York, N.Y., a corporation of Delaware Original No. 3,059,074, dated Oct. 16, 1962, Ser. No. 722,194, Mar. 18, 1958. Application for reissue Oct. 14, 1964, Ser. No. 418,364
Claims priority, application Italy, Apr. 9, 1957, 570,614
11 Claims. (Cl. 200—87)

Matter enclosed in heavy brackets [ ] appears in the original patent but forms no part of this reissue specification; matter printed in italics indicates the additions made by reissue.

This invention relates to switching devices and particularly to a device for the control of electrical circuits.

An object of this invention is to provide a switching device which is easy to manufacture, economical, reliable and which can be replaced without difficulty. It is also designed to be fabricated in mass production by automatic machines.

Heretofore there have been used devices for the control of electrical circuits which comprise a vessel, air evacuated or filled with an inert gas, containing a movable magnetic structure operated by external magnetic forces to control the circuit making and breaking contacts of such devices. Said movable armatures are generally made with magnetic material wires sealed into the ends of a glass tube and having a portion of the free ends thereof, enclosed inside the tube, overlapped in order to be approached and to make contact by means of an external magnetic force.

Such relays in addition to having various drawbacks such as complex mounting inside the protective vessel, require the delicate adjustment and are difficult to manufacture.

One of the features of this invention is to provide an electric circuit controlling device made with magnetic material, of small size, sealed at one end only of a container vessel, having one movable part only and a stationary part, both extending inside said tube from said single end, the electric contacts and the magnetic material of the supports being protected from corrosion and oxidation as the vessel is air evacuated or filled with an inert gas, said last operations being made from the end opposite to that into which said metal parts are sealed, facilitating mass production of such devices.

Another feature of this invention is to form the whole magnetic structure starting from a single bar of magnetic material after having subjected it to a few mechanical operations to shape it in accordance with the required application.

A further feature of this invention is to provide a metallic, rigid and complete structure in a single piece, after having been shaped, to be inserted into the container vessel from one end thereof and there sealed without the help of special tools, to support the members within the tube, the external terminals of the switching device being placed at one end of the container vessel offering a number of advantages in its manufacture, in its supporting arrangement and in its application.

Another feature of the present invention is to form the whole magnetic member from a single rod or wire made of magnetic material subjecting said rod or wire to a limited number of mechanical operations to shape it according to the required employment.

A further feature of this invention is to shape in a particular way a portion of the magnetic structure, the movable one, whereby there is exploited the alternative actions of attractions and repulsions built up in the movable element, carrying the contact, under the action of the electromagnetic external field, resulting in a firm contact closure using a magnetic field of low intensity and providing a damping action on the rebound effect of the movable member, with consequent advantages.

A further feature of the present invention is to obtain a single rigid and complete unit with a single piece, to be then introduced into the container tube and there sealed without special tools to adjust metallic elements inside the tube, the switch device being mechanically and electrically adjusted before being introduced in the protective vessel; external terminals of the switch device being perfected after sealing of the switch member inside the container tube, providing therefore several advantages and making its manufacture easy.

The above-mentioned and other features and objects of this invention will become apparent by reference to the following description taken in conjunction with the accompanying drawings, in which.

Figure 1:
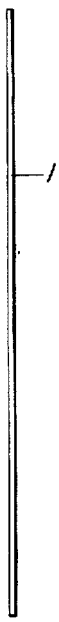
FIG. 1 is a side view of a rod or wire of magnetic material before being fabricated into contact springs in accordance with the invention.
Figure 2:
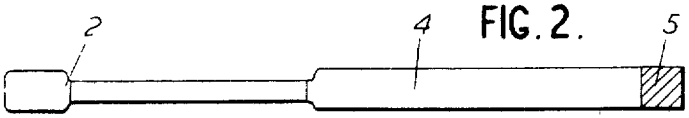
FIG. 2 is a longitudinal plan view of the rod shown in FIG. 1 after it has been subjected to a number of forming operations.

Referring now to FIG. 1 of the drawing, there is shown a side view of a rod or wire 1 made of magnetic material. The element 1 may be generally of parallel section. As shown in FIG. 2 the element 1 may be flattened at its opposite ends to form a short portion 2 and a longer portion 4. The outer end of the portion 2 on one side thereof is then electroplated with a metal of good electrical conductivity such as platinum, rhodium, silver, etc. A similar plating will be applied to the corresponding side of the outer end of the portion 4, as indicated at 5. Alternatively, contact surfaces could be welded or riveted to the portions 3 and 5 as is understood by those skilled in the art.

Figure 3:
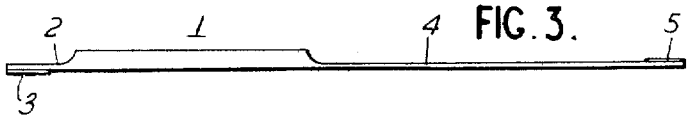
FIG. 3 is a front view of the rod shown in FIG. 2.

FIG. 3 is a front view of the rod shown in FIG. 2. From FIG. 3 it may be seen how the portion 1a connects the portions 2 and 4, respectively.

Figure 4:
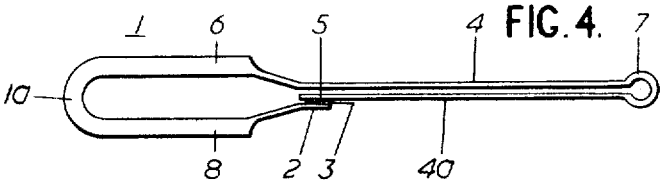
FIG. 4 is a front view of the rod shown in FIG. 3 after it has been subjected to a number of further forming operations.

As shown in FIG. 4, the bar 1 is given a first U-shaped bend in the middle of the portion 1a so that the portion 1a has two parallel sides 6, 8, which are spaced a distance equal to the diameter of the curve around which it is bent. The portion 4 is bent near the middle so that a parallel portion 4a extends towards the arm 8 so that the contact portion 5 is adjacent to the contact portion 3. The bend of the portion 4 is in the form of a ring shown at 7 and which ring provides a resilient mounting for the arms *4a*. The ring 7 will also aid in preventing fatigue to the bend in the portion 4. The ring 7 may also, under certain conditions, provide a clamping point for centering and securing the element when it is positioned within a vessel. The tension in the arm 4a is such that the contact portion 5 is normally out of contact with the corresponding portion 3.

After formation of the structure shown in FIG. 4, the entire organization is inserted into an envelope 9 which may be of glass or any suitable material. The envelope 9 may be sealed around the arms 6 and 8 at 10. By means of the tubulation 11, the envelope 9 may be evacuated and, if desired, an inert gas may be introduced within the envelope to prevent oxidation of the contacts due to arcing when in operation. The tubulation 11 may be sealed off in accordance with known techniques and will not be further described. After the sealing of the envelope 9 the connecting portion 12 of the member 1 may be cut away along the line A—A thereby forming two terminals 13, 14 for connection to an external electrical circuit (not shown) and which it is desired to control.

By applying a magnetic flux to the middle of the envelope 9 and from its exterior, the arm 4a may be caused to be drawn downwardly causing the contact portion 5 to close against the contact portion 3, thus completing an electrical circuit. The magnetic flux just mentioned, may be derived either from a permanent magnet (not shown) or from an electromagnetic winding 29 which may be disposed thereabout the envelope 9 as shown, for instance, in FIG. 9.

The resultant gap between the contact surfaces 3 and 5 may be adjusted before enclosing the member 1 within the envelope 9. Such adjustment is not critical and the ring 7 lends itself to such ready adjustment.

The applicaton of magnetic flux to the portions 4, 4a and 2, causes the acceleration of the portion 4a, which now acts as an armature, away from the arm 4, and the portion 2 exerts a braking action on the speed of the displacement of the movable arm 4a. This acceleration and braking action is an important effect derived from the unique construction disclosed.

Figure 5:
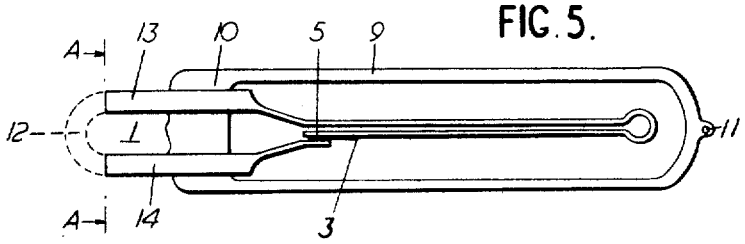
FIG. 5 is a front view partly in section of the structure of FIG. 4 placed within an envelope.

The output terminals 13 and 14 shown in FIG. 5 will be seen to extend from one end of the envelope 9 and this enables the mounting of the completed switch in a socket similar to the type used for the mounting of electronic tubes. When an electromagnetic coil is placed about the exterior of the tube 9 and is connected to a current source to provide magnetic lines of force along the elements 2, 4 and 4a, it thereby causes displacement of the movable contact 5 towards the stationary contact 3 to close the circuit between terminals 13 and 14. The flux in the portions 4 and 4a causes a repulsion therebetwen and which flux acts to dampen the rebound effect when the contacts are open.

It will be understood that the material from which the rod 1 is selected should have a coefficient of expansion similar to the glass or other material from which the envelope 9 is made.

Figure 6:
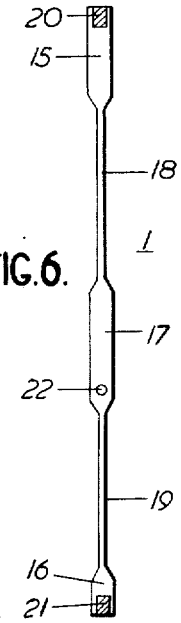
FIG. 6 is a longitudinal plan view of the rod shown in FIG. 1 after it has been subjected to a number of forming operations according to another embodiment of the invention.
Figure 7:
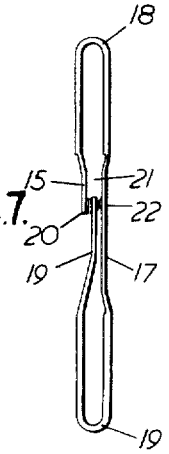
FIG. 7 is a front view of the rod shown in FIG .6 after it has been subjected to a number of further forming operations.
Figure 8:
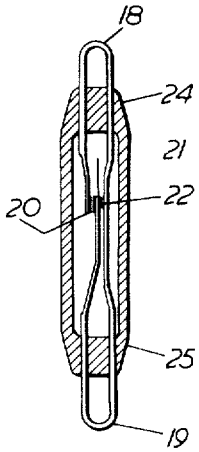
FIG. 8 is a front view partly in section of the structure of FIG. 7 placed within an envelope.
Figure 9:
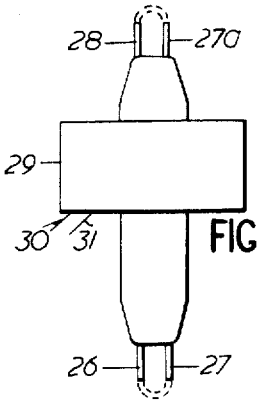
FIG. 9 is a front view of the entire structure of FIG. 8 and the manner in which the connecting terminals are formed and the energizing coil is placed around the protective envelope.

This invention is not limited to a single make-contact switching device, as shown in FIGS. 1–5, but the invention may also be utilized to provide a single pole, double-throw contact arrangement. This embodiment is contained in FIGS. 6–9. In FIG. 6 a longitudinal plan view of the rod 1 is shown after it has been subjected to a number of forming operations. The rod 1 is flattened at its opposite ends to provide portions 15 and 16 respectively, and in addition, there is an intermediate flattened portion 17, as shown. Thus, the central flattened portion 17 is connected to the end-flattened portions by means of connecting portions 18 and 19, respectively. The portions 18 and 19 have the same cross-section as the original rod 1. The portions 15, 16 and 17 are all in the same plane. The end of the portion 15 is coated with a contact material 20 on one side thereof and the end of the portion 16 is coated with contact material 21 on both sides thereof. The portion 17 is coated at a point nearer to the end 16 with a material 22 having good electrical conductivity on one side thereof, such side being identical with the side of the coating 20. In lieu thereof, a contact having a predetermined thickness may be secured to the portion 17 by welding or by any other suitable fastening means. The contact 22 is made with a predetermined thickness because it is to be used as a spacing element for reasons which will be later explained. After application of the contacting surfaces, as aforesaid, the member 1 is bent as shown in FIG. 7 and which figure is a side view of the structure shown in FIG. 6, after bending thereof. The connecting portion 18 is bent into a U-shape and the connecting portion 19 is similarly bent into a U-shape. It will now be seen that the double-coated end 16 lies between the coating 20 and contact 22. It will be seen from FIG. 7 that the flattened portions 15, 16 and 17 are situated at the center of the organization, whereas, the connecting portions 18 and 19 are at opposite ends thereof. The thickness of the contact 22 should be sufficient so that the contact 21 normally lies thereagainst. This will be the back contact of the switch. The spacing between the fixed contact 20 and the other side of contact 21 should be such that there is a gap of predetermined length therebetween. The flat portions 15, 16 and 17 are bent inwardly toward each other, as shown in FIG. 7, to achieve the desired gap spacing. The entire organization of FIG. 7 may be then inserted into an envelope 23 having ends 24 and 25, respectively, and the connecting portions 18 and 19 may be sealed at said ends as shown in FIG. 8. After sealing, two hairpin-shaped loops will extend outwardly from opposite ends of the envelope. These ends may be severed as shown in FIG. 9 thereby defining four terminals to which connection may be made for control of an external electrical circuit (not shown). Thus, the terminal 26 will be connected to the movable contact 21; the terminals 27, 27a will be connected to the fixed back contact 22 and the terminal 28 will be connected to the front contact 20. The winding 29 may surround the envelope and may be energized over its leads 30 and 31 by connection thereof to a suitable potential source.

While we have described above the principles of our invention in connection with specific apparatus, it is to be clearly understood that this description is made only by way of example and not as a limitation to the scope of our invention as set forth in the objects thereof and in the accompanying claims.

We claim:

1. A magnetically controlled electric switch, comprising a first and a second metal bar each formed from a single piece of magnetic material and each having a flattened portion joined by a portion of greater thickness than the flattened portion, a plurality of electric contacts one at the flattened end of each bar, said first bar being bent back upon itself at a pair of points intermediate its ends to form a substantially complete single loop and with said flattened portions in closely spaced magnetic relation throughout their lengths, an enclosing evacuated envelope within which said flattened portions and said contacts of each bar are enclosed with the said thick portion of each bar extending externally out of one end of said envelope and sealed therethrough in a vacuum-tight manner, and with the ends of the said flattened portion of said bars overlapped to position the said contacts into registry with each other.

2. An electric switch as set forth in claim 1 wherein an electromagnetic winding is disposed outside said enevolpe in flux relation with said flattened [closed] *closely* spaced portions of said first bar so that energization of said winding causes the contact-carrying flattened end of said first bar to be moved as an armature away from the contact on said second bar.

3. A magnetically controlled switch according to claim 1 in which *one of* the said bends is enclosed within said envelope and provides a flexible joint between said flattened [closed] *closely* spaced portions of the said first bar.

4. A magnetically controlled switch according to claim 1 in which *one of* the said bends is enclosed within said envelope and is formed intermediate the ends of said flattened portion of the said first bar.

5. A magnetically controlled switch according to claim 4 in which said bend has a diameter of curvature which is greater than the spacing between said flattened closely spaced portions of said first bar.

6. *The magnetically controlled switch according to claim 1 in which the portion of greater thickness is separated into two sections by a third flattened portion having an electrical contact thereon, one of said pair of points being in one of said two sections and the other of said pair of points being in the other of said two sections, the over-lapped ends of said flattened portions being positioned adjacent said third flattened portion and oriented to form a single pole, double throw switching combination.*

7. *The magnetically controlled switch according to claim 6 wherein one of said two sections extends externally out of one end of said envelope and the other of said two sections extends externally out of the other end of said envelope, said two sections being sealed into the ends in said vacuum-tight manner.*

8. *A magnetically controlled electric switch, comprising a first and a second metal bar formed from a single piece of magnetic material, each of said bars having a flattened portion joined by at least one portion of greater thickness than the flattened portion, a plurality of electric contacts one at the flattened end of each bar, said magnetic material being bent back upon itself at a pair of points intermediate its ends to form a substantially complete single loop, an enclosing evacuated envelope within which said flattened portions and said contacts of each bar are enclosed with the said thick portion of each bar extending externally out of at least one end of said envelope and sealed therethrough in a vacuum-tight manner, and with the ends of the said flattened portion of said bars overlapped to position the said contacts into registry with each other.*

9. *A magnetically controlled electric switch comprising a magnetic reed contact member formed from a single elongated piece of magnetic material, said material enclosed in an envelope being flattened at the two ends and at a central portion thereof, at least each of said ends and said central portion having a good electrically conductive material thereon sealed in said envelope, the unflattened parts of said magnetic material having two points with a substantially U-shape projecting beyond said envelope so that the two flattened ends have their faces parallel and overlapping with each other and parallel to a face of the flattened central portion, said U-shaped projections being cut apart outside said envelope, and said electrically conductive material being oriented to provide a single throw, double pole contact combination.*

10. *The electric switch as set forth in claim 9 in which said contact combination is sealed in an evacuated envelope, and an electromagnetic winding disposed outside said envelope, one of the two ends being relatively more movable than the other end responsive to flux generated when said winding is energized, the movable end being normally positioned to rest on the contact formed by the flattened central portion of the magnetic material, the other less movable of said two ends being positioned to make electrical contact with said movable end responsive to flux generated when said winding is energized.*

11. *A reed switch assembly forming a break-make contact combination having two stationary reed contacts with a movable reed contact positioned between them, said three reeds being sealed in an envelope, said movable reed contact extending in substantially parallel relation with one of said stationary reed contacts which said movable contact touches when in a rest position, said one stationary contact being an elongated piece of magnetic material extending through one end of said envelope, across the entire envelope, and out the other end of the envelope, said movable reed contact extending in a substantially aligned series relation with the other of said stationary reed contacts with said movable contact spaced away from said other stationary contact when in a rest position, and means external to said envelope for generating magnetic flux in said reeds to cause said movable contacts to break from said one stationary reed and to touch said other stationary reed.*

References Cited by the Examiner

The following references, cited by the Examiner, are of record in the patented file of this patent or the original patent.

UNITED STATES PATENTS

| | | | |
|---|---|---|---|
| 684,094 | 10/1901 | Potter | 200—144 |
| 1,509,965 | 9/1924 | MacFarland | 200—113 |
| 1,583,496 | 5/1926 | Shafer | 200—122 |
| 1,791,888 | 2/1931 | Dorn | 200—87 |
| 1,894,150 | 1/1933 | Beers | 200—138 |
| 2,060,235 | 11/1936 | Miller | 200—144 |
| 2,245,391 | 6/1941 | Dickten | 200—87 |
| 2,289,830 | 7/1942 | Ellwood | 200—87 |
| 2,406,021 | 8/1946 | Little | 200—87 |
| 2,457,218 | 12/1948 | Ferrell | 49—81 |
| 2,506,414 | 5/1950 | Ellwood | 200—87 |
| 2,611,352 | 9/1952 | Molyneux | 200—90 |
| 2,653,199 | 9/1953 | Brown et al. | 200—87 |
| 2,845,506 | 7/1958 | Delucia | 200—87 |
| 2,892,051 | 6/1959 | Moore | 200—81.9 |
| 2,929,895 | 3/1960 | Shebanow | 200—87 |
| 2,969,434 | 1/1961 | McGuire et al. | 200—87 |

FOREIGN PATENTS

| | | |
|---|---|---|
| 1,028,039 | 9/1950 | France. |

BERNARD A. GILHEANY, *Primary Examiner.*

B. DOBECK, *Assistant Examiner.*